June 23, 1970    W. E. BAHNER    3,516,888
METHOD OF MOUNTING STONES IN A FOAM PLASTIC PANEL
Filed Sept. 28, 1966

Wilburn E. Bahner
INVENTOR.

BY Ramsler O. Wyatt
ATTORNEY 3,516,888
METHOD OF MOUNTING STONES IN A FOAM PLASTIC PANEL
Wilburn E. Bahner, 103 Avondale, Apt. 3, Houston, Tex. 77006
Filed Sept. 28, 1966, Ser. No. 582,623
Int. Cl. *B32b 31/00; C09j 5/02*
U.S. Cl. 156—298     1 Claim

ABSTRACT OF THE DISCLOSURE

A wallboard formed of dense polystyrene foam having natural stones glued to the outer surface, a glue being employed containing a solvent which will dissolve the surface of the foam adjacent each stone being mounted, embedding the stone in the material.

---

This invention relates to new and useful improvements in a wall board and in the method of manufacturing same.

It is an object of this invention to provide a novel wall board of light weight material having natural stone, or the like, mounted on the outer surface.

It is another object of the invention to provide a wall board of a polystyrene foam such as the present material marketed as styrofoam, or the like, which may be easily and cheaply procured, and processing same to form rock receiving beds in the exposed surface thereof, and mounting rocks in said beds to provide a decorative panel.

Figure 1:
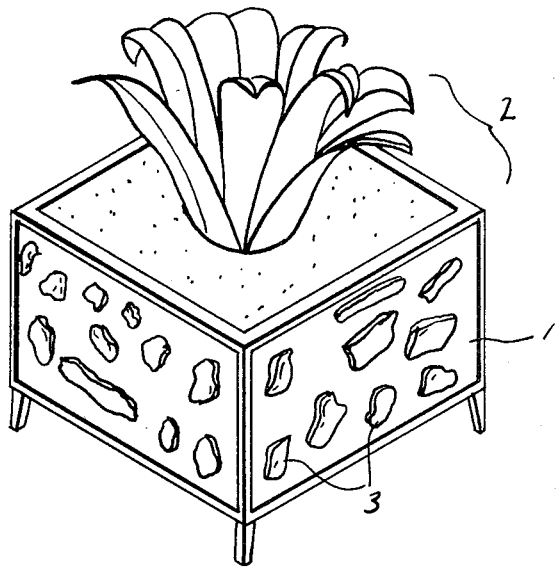
Figure 2:
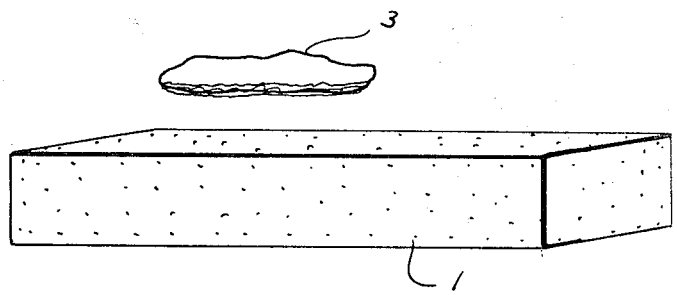
Figure 3:
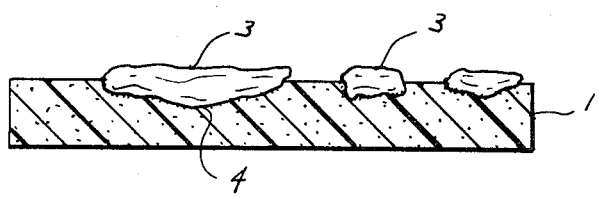

With the above and other objects in view, the invention has relation to certain novel features of construction, operation and arrangement of parts more particularly defined in the following specification and illustrated in the accompanying drawings, wherein:

FIG. 1 is an elevational perspective view of wallboard formed in accordance with this invention and built into a planter box, FIG. 2 is a side elevational view of a block of material with a stone in preparatory position for mounting, and FIG. 3 is a side elevational view of a block, in cross section, showing the beds formed therein and the stones mounted in said beds.

Referring now more particularly to the drawings, the numeral 1 designates a block of polystyrene foam material, such as styrofoam, or similar inorganic foam plastic, shaped in any suitable dimension, as in the rectangular panels shown, used to build a planter box as 2.

Stones 3, 3, or similar rigid material suitable for decorative purposes, are mounted in the outside face of the panels 1 by coating the underside of each such stone, or the like, with a glue containing a solvent, such as methyl acetate, and the stone, or the like, is then applied to the side of the panel 1 and a gentle but constant pressure applied to the stone, to maintain a firm contact with the panel, and the solvent in the glue will dissolve the surface of the panel sufficiently to form a depression therein, having the same exact contours as the stone being mounted. As the glue hardens, the stone 2 will be secured in place in the bed so formed and in the outer surface of the panel.

The novel method of manufacture of said wallboard is substantially as follows: A panel is formed of polystyrene foam such as styrofoam, or the like, of the desired dimensions and one outside surface is selected to receive the decorative pieces. Stones, or the like, are selected for mounting in the panel, and are carefully inspected and the position in which they are to be mounted on the panel is determined. The underside of the stone is then coated with a suitable glue having methyl acetate, or a similar solvent, therein, and the side so treated is pressed against the panel at the desired location and a firm pressure maintained thereagainst until a bed is formed in the panel and the said glue sets. When this process has been repeated until all of the stones, or the like, are mounted on each panel, as desired, the panels may be employed to form a planter box, as 2, or for any other use wherein decorative panels are normally employed.

What I claim is:
1. The method of manufacturing a wall board comprising:
   (a) forming a rigid backing member to the desired size and shape.
   (b) mounting a panel of cured plastic foam on one face of said backing member.
   (c) coating one face of stones to be mounted in the panel with a glue having a solvent for said plastic foam therein.
   (d) pressing the coated surface of said stones into said panel and maintaining said pressure until the glue has dissolved the surface of said plastic foam adjacent each stone and set.

References Cited
UNITED STATES PATENTS

| | | | |
|---|---|---|---|
| 1,589,848 | 6/1926 | Harrison | 161—27 |
| 1,916,308 | 7/1933 | Grieco | 52—315 |
| 2,047,648 | 7/1936 | Pollard | 52—315 |
| 2,618,901 | 11/1952 | Braun. | |
| 3,097,080 | 7/1963 | Weir. | |
| 3,132,988 | 5/1964 | Fowler | 161—16 |
| 3,192,063 | 6/1965 | Donofrio | 117—33 XR |
| 3,232,017 | 2/1966 | Prusinski et al. | 52—309 |
| 3,261,126 | 7/1966 | Marks | 161—27 XR |
| 3,331,175 | 7/1967 | Terrio | 52—315 |
| 3,337,390 | 8/1967 | Saunders | 161—160 |

JOHN T. GOOLKASIAN, Primary Examiner
GEORGE W. MOXON II, Assistant Examiner

U.S. Cl. X.R.
156—307, 308; 161—159, 160, 162, 164